Aug. 16, 1927.

L. E. LA BRIE 1,639,095

BRAKE APPLYING MEANS

Filed Aug. 17, 1925

INVENTOR
LUDGER E. LA BRIE
BY
ATTORNEY

Patented Aug. 16, 1927.

1,639,095

UNITED STATES PATENT OFFICE.

LUDGER ELIZÉ LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE-APPLYING MEANS.

Application filed August 17, 1925. Serial No. 50,715.

This invention relates to brakes, and is illustrated as embodied in novel applying mechanism for a brake on a front or other swivelled wheel. An object of the invention is to provide a novel adjustment to compensate for wear of the brake lining, by clamping in any desired angular position an operating lever which, in the case of an expanding brake, may be loosely mounted on the brake-expanding shaft and adjustably clamped to an adjacent lever fixed on the shaft.

When used for a brake on a swivelled wheel, I prefer that the movable lever shall have a part movable, in applying the brake, from an idle position spaced from the swivelling axis of the wheel to an active position substantially in that axis. This part of the lever is engaged by the brake-applying means, illustrated as a generally horizontal lever.

The above and other objects and features of the invention, including various novel combinations of parts and desirable particular constructions, will be apparent from the following description of one illustrative embodiment shown in the accompanying drawings, in which.

Figure 1:
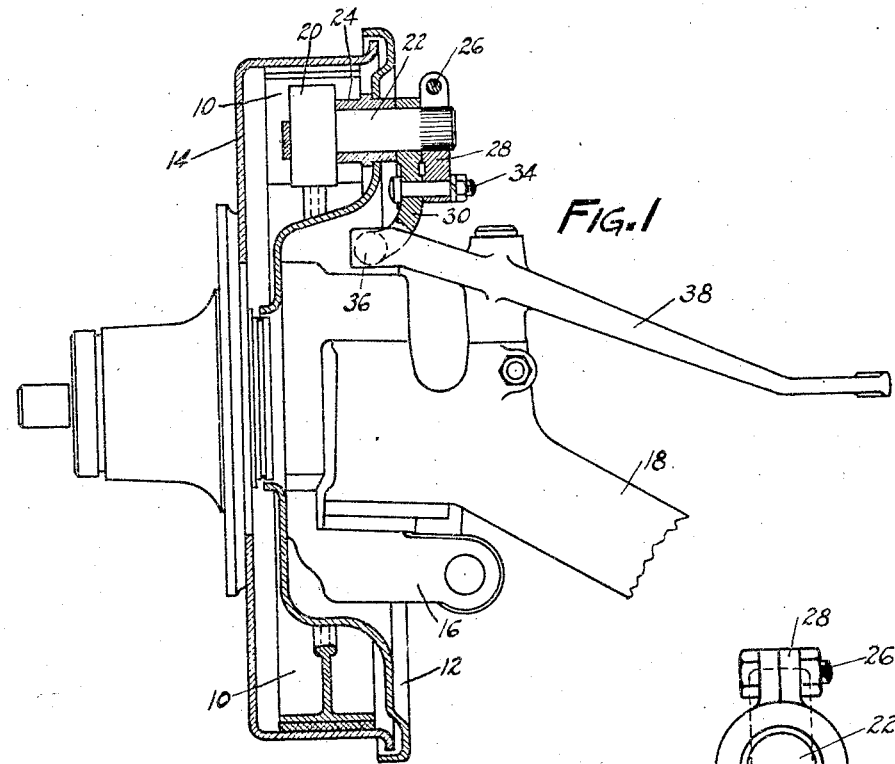
Fig. 1 is a vertical section through a front brake, showing the control in rear elevation.

In the arrangements illustrated, the shoes or equivalent friction means 10 are arranged between a backing plate 12 and a drum 14, the drum being rotatably mounted with the wheel on a knuckle 16 carrying the backing plate 12 and swivelled by means of the usual king-pin at one end of the axle 18. The brake may be applied by means such as a double cam 20, arranged between the drum and backing plate, and operated by a short shaft 22 extending through the backing plate. The shaft 22 is journalled in a support or bracket 24 carried by the backing plate.

Figure 2:
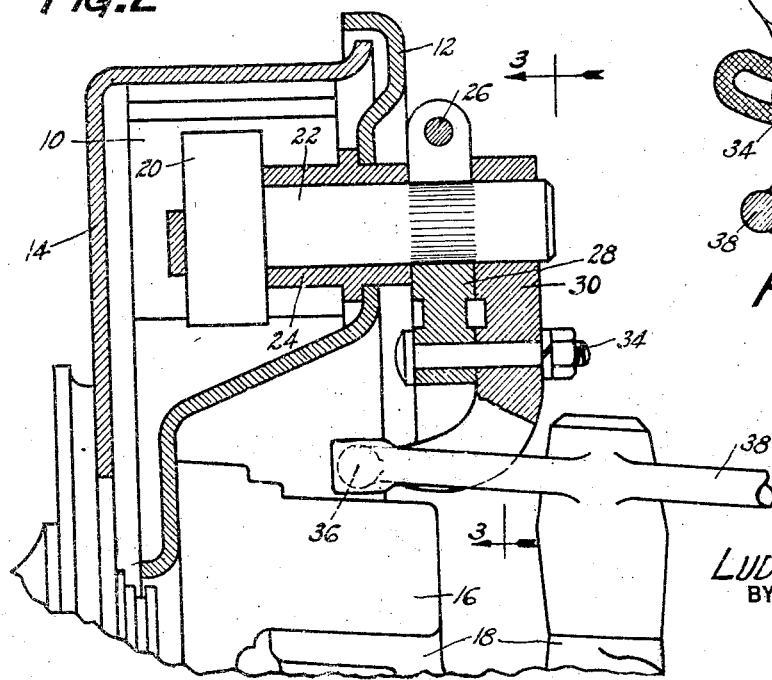
Fig. 2 is a vertical section corresponding to the upper part of Fig. 1, but showing a modification.

On the serrated end of shaft 22 (Fig. 1), or nearly at the end of the shaft (Fig. 2) is secured by a suitable clamp screw 26 a fixed lever 28, adjacent which there is loosely sleeved an angularly adjustable or movable lever 30. Lever 30 is inside of lever 28 in the modification of Fig. 1, and outside in Fig. 2.

Figure 3:
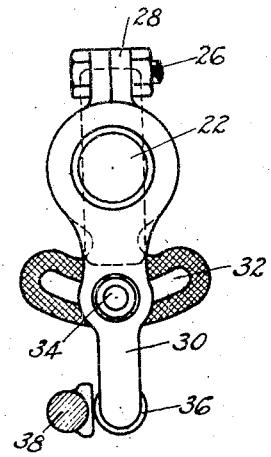
Fig. 3 is a partial vertical section on the line 3—3 of Fig. 2, showing the relatively-adjustable levers in inside elevation.

One of the levers, shown as the lever 28, is formed with an arcuate slot 32 (Fig. 3) receiving a clamping bolt 34 passing through the other lever, thus providing means for holding the lever 30 in any desired position of angular adjustment. If desired, the adjacent faces of levers 28 and 30 may be serrated to form interlocking teeth.

The movable lever 30 has a part, preferably a ball 36 at its end, movable in applying the brake from an idle position spaced from the swivelling axis of the wheel (i. e. the axis of the king-pin) to an active position substantially in that axis. This part of the lever is engaged by the brake-applying means, such as a vertical plane surface on the end of a generally horizontal operating lever 38 fulcrumed on the axle 18.

If it is desired to relieve the outer brake in rounding a corner, the point of engagement between levers 38 and 36, when the brake is applied, is not exactly in the swivelling axis but a fraction of an inch from that axis on the side next the wheel, and the two front brakes are not equalized against each other.

While two illustrative embodiments have been described in detail, it is not my intention to limit the scope of the invention to those particular embodiments, or otherwise than by the terms of the appended claim.

I claim:

A control for a brake on a swivelled wheel comprising, in combination, a shaft having brake-applying means, two levers on the shaft, one fixed to the shaft and the other movable, the movable lever having a part movable in applying the brake from an idle position spaced from the swivelling axis to an active position substantially in that axis, means to clamp the two levers together in any desired position of relative angular adjustment, and an operating lever movable about a vertical axis between its ends and engaging at one end said part of the movable lever.

In testimony whereof I have hereunto signed my name.

LUDGER ELIZE LA BRIE.